United States Patent [19]

Steigelmann

[11] 4,188,817
[45] Feb. 19, 1980

[54] METHOD FOR DETECTING MEMBRANE LEAKAGE

[75] Inventor: Edward F. Steigelmann, Naperville, Ill.

[73] Assignee: Standard Oil Company (Indiana), Chicago, Ill.

[21] Appl. No.: 948,334

[22] Filed: Oct. 4, 1978

[51] Int. Cl.² ............................................ G01M 3/22
[52] U.S. Cl. .................................................... 73/40.7
[58] Field of Search ................ 73/40, 40.7, 45.5, 49.1

[56] References Cited

U.S. PATENT DOCUMENTS

| 3,254,526 | 6/1966 | Yarbrough | 73/40 |
| 3,425,264 | 2/1969 | Frei | 73/40.7 X |
| 3,842,659 | 10/1974 | Bacroix | 73/40.7 |
| 3,975,943 | 8/1976 | Brachet | 73/40.7 X |
| 3,981,701 | 9/1976 | Andersen et al. | 73/40.7 X |
| 4,135,384 | 1/1979 | Berwell, Jr. et al. | 73/40.7 |

*Primary Examiner*—S. Clement Swisher
*Attorney, Agent, or Firm*—Frank J. Sroka; Arthur G. Gilkes; William T. McClain

[57] ABSTRACT

Method for detecting leakage of semipermeable membranes or hollow fibers, said membranes or fibers exhibiting salt rejection, which comprises contacting one side of the membrane or fiber with an aqueous salt solution so that purified water will pass across non-leaking members to the second side and a salt enriched aqueous solution will pass to the second side of leaking members, and measuring the salt content of the aqueous solution on the second side of the member so that leaking members can be detected.

4 Claims, 9 Drawing Figures

FIG. 4a
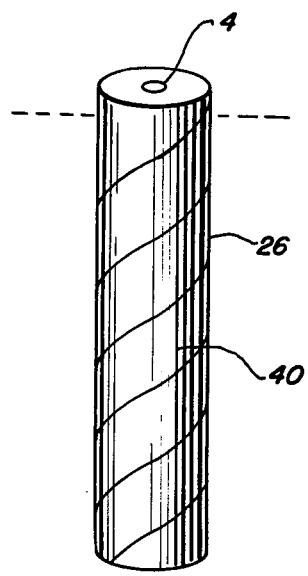
FIG. 4b
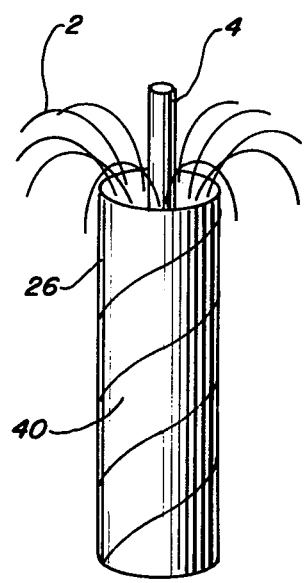
FIG. 4c
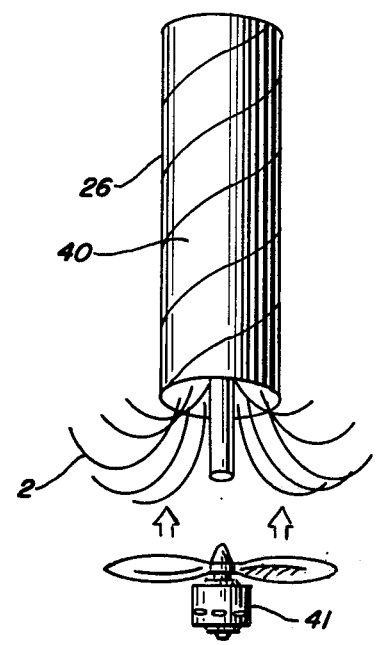
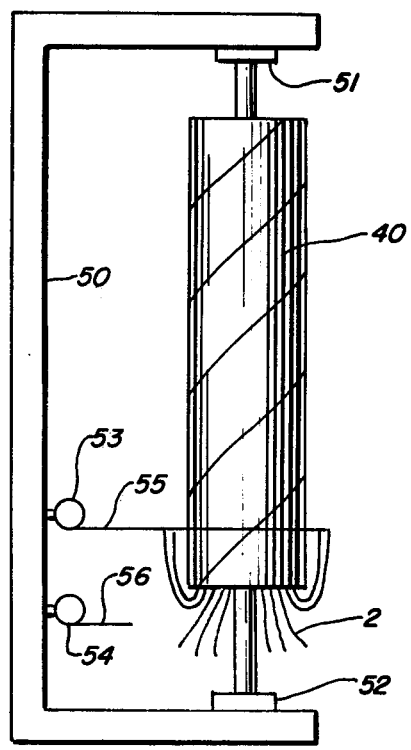
FIG. 5a
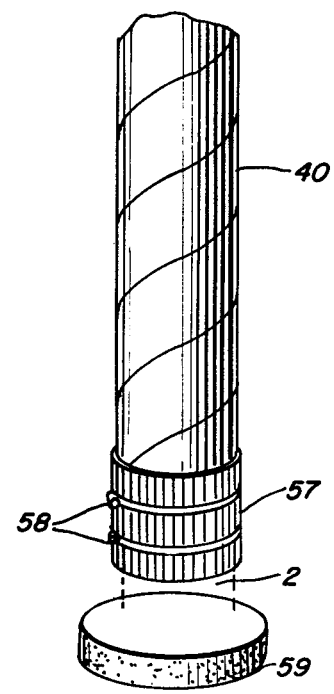
FIG. 5b

METHOD FOR DETECTING MEMBRANE LEAKAGE

BACKGROUND

This invention relates to a method for the manufacture of membranes and membrane separation units and the detection and location of leaks. These membranes and membrane separation units are useful in the separation of components from mixtures containing them, especially the separation of olefinic compounds from saturated materials.

It is often desirable to separate components from mixtures for a variety of purposes such as purification, isolation of certain components, and the like. This is often true regarding mixtures containing olefins. For example, Kaplan, U.S. Ser. No. 919,861 filed June 28, 1978 now U.S. Pat. No. 4,154,770 directed to the removal of olefinic compounds from hydrocarbon mixtures containing olefins and saturates so that an olefin rich stream can be passed to an alkylation unit, thereby improving the alkylation process. Also, U.S. Ser. No. 948,339, filed concurrently with this application is directed to recovering unreacted olefinic compounds from polymerization reactor streams so that the olefinic compound can be recovered and recycled. There are a myriad of other instances where various separations are useful.

A most common technique of separating materials is by distillation. However, where the materials have similar boiling points, such as an olefinic compound and its corresponding saturated compound, suitable separation by distillation is expensive. Another method of separating olefinic compounds from saturated materials is through the use of semipermeable membrane separators. The mixture of compounds to be separated contacts one side of a semipermeable membrane and an enriched olefinic stream is removed from the other side. While polymeric membranes can be made which are capable of such separation, the preferred separators use an aqueous liquid barrier containing metal containing ions in conjunction with semipermeable membranes. The metal containing ions are capable of forming reversible water soluble complexes with olefinic compounds. By maintaining an olefinic compound partial pressure differential across the membrane, olefinic compounds are selectively transported across the membrane. This type of separator and process is more fully described in U.S. Pat. Nos. 3,758,603; 3,758,605; 3,770,842; 3,812,651; 3,844,735; 3,864,418; 4,014,665; and 4,060,566 which are hereby incorporated by reference and made a part hereof.

The membrane separator or separation zone comprises a semipermeable membrane and is capable of separating olefinic compounds from mixtures containing them. Preferably the separator comprises a semipermeable membrane which is used in conjunction with a liquid barrier comprising aqueous metal containing ions capable of forming soluble-reversible complexes with the olefinic compound to be separated. By maintaining a suitable partial pressure differential of the olefinic compound to be separated across the membrane, the olefinic compound is selectively transported across the membrane and the liquid barrier so as to effectively and substantially separate the olefinic compound from saturated hydrocarbons. The partial pressure differential across the membrane can be maintained by removing olefinic compound which is passed through the semipermeable membrane with a gaseous or liquid sweep comprising hydrocarbon or nonhydrocarbon compounds, use of vacuum, or other techniques. It is generally preferred to use saturated hydrocarbon sweeps.

The essentially solid, water-insoluble, semi-permeable membranes or films employed in the process of the present invention can be hydrophobic, but preferably are hydrophilic. Hydrophilic membranes permit the liquid barrier to be within the membrane at least to a significant extent. The hydrophilic membranes include membranes which contain additional hydrophilic and/or hygroscopic agents, and those that do not. A film membrane is considered hydrophilic if it absorbs at least about 5 weight percent of water when immersed in distilled water for one day at room temperature and pressure. Typical membranes are those formed of film-forming materials such as nylon, e.g. the N-alkoxyalkyl polyamides, and those formed of nylon and more hydrophilic polymers such as polyvinyl alcohol, polyvinyl ethers, polyacrylamides and the like. A preferred material is cellulose triacetate. The polymer materials can be formed into single membrane structures of desired configurations, as for example, by casting, or they can be formed into hollow fiber films by extrusion from solution or pseudo-solutions and subsequently bundled into an array. The hollow fiber membranes are preferred because they provide a large surface contact area for a given equipment volume. For instance, separation can be achieved using hollow fiber membranes when the feed gas or liquid is passed to the outside of the fibers, the sweep fluid is passed through the inside of the fibers and the material undergoing separation passes from the outside to the inside of the hollow fibers. But preferably the feed is passed through the inside of the fibers, sweep fluid is passed on the outside of the fibers, and the material undergoing separation passes from the inside to the outside of the hollow fibers.

The hollow fibers are commonly anisotropic, having a thin outer skin over a somewhat more porous supporting structure. These fibers are generally kept wet or damp with water because drying can adversely affect the membrane structure. Such fibers are available commercially for use in water desalination. Such separation units have U-shaped hollow fibers held within a container wherein feed is passed into the container and product water is passed through the fiber wall to the fiber bore. The purified water then trickles out a fiber end and out of the separator. This exemplifies a single ended permeator wherein the opposite fiber ends are in communication with essentially the same composition. For water desalination, communication into one end and out the other end of a hollow fiber is not necessary as it generally is in the facilitated transport of olefins. For the latter process, it is desirable to have a double ended permeator so that a feed can be introduced to the membrane and saturate rich effluent removed, while a sweep fluid passes the opposite side of the membranes to remove permeated olefin. A double ended permeator is a permeation unit wherein the opposite ends of elongated hollow fiber membranes are in communication with different compositions. Therefore, it is useful to be able to convert the single ended type permeation unit to a double ended unit.

Hollow fiber membranes are commonly held in place with a potting agent such as epoxy. It has been found that when anisotropic fibers which are potted by certain techniques are used in certain membrane separation units, especially those for the separation of olefinic compounds by facilitated transport, the potted fiber ends are deleteriously affected and leaking occurs. In commercial type membrane separating units, the units have high density packing of hollow fibers. When potting the ends of such units in epoxy, heat from the highly exothermic reaction of the epoxy can damage the fibers. The larger the epoxy pot, the more severe the problem because the pot is self heating on the inside and self insulating on the outside.

During the manufacture of membranes or fibers, irregularities, moles or damaged portions can occur causing such membranes or fibers to be incapable of maintaining fluids, especially liquids, on one side of the membrane or fiber. Also, membranes or fibers can be damaged in the manufacture of separation devices through improper handling and the like, thereby causing the membranes or fibers to leak when used in separation devices. Such leaking causes a loss in selectivity and can cause a loss of aqueous liquid separation barriers, such as aqueous silver ion solution. In order to maintain proper separator performance and selectivity, and to prevent loss of liquids, it is desirable to minimize the number of leaking membranes or fibers. Before the leaking members can be removed or plugged, they must be detected and sometimes located. This can be especially difficult in a large bundle of small diameter hollow fiber membranes due to their small size and congestion of fibers.

It is an object of this invention to provide a method of detecting leaks in membranes exhibiting salt rejection, especially hollow fibers.

SUMMARY OF THE INVENTION

This invention relates to a method for the manufacture of membranes and membrane separation units, especially those made from hollow membrane fibers. This invention especially relates to the detection and location of leaking membranes or fibers. These membranes and membrane separation units are useful in the separation of components from mixtures containing them, especially the separation of olefinic compounds from saturated materials.

Single ended membrane separation units having U-shaped wet elongated anisotropic hollow fiber membranes, commonly used in water desalination, can be converted into double ended membrane separation units useful for the separation of olefinic compounds from mixtures containing them. The method for converting the membrane separation unit comprises eliminating the bent U-shaped portion of the fibers leaving cut fiber ends. This can be done by cutting or mechanically removing a small portion of the bent fibers in the U portion of the membrane unit. Substantially all of the cut fiber ends which are to be potted are then exposed to drying conditions so as to remove a substantial portion of the moisture contained in or on the fibers. The portion of the membranes which are to be dried are dried until they are essentially dry to the touch of a human hand. Preferably, the membranes are dried to hold less than about 90 wt.% of the amount of water held by them in a fully saturated condition. This drying is extremely important, especially in membrane separation units having a diameter of fiber bundle in excess of about 3 inches. This drying improves epoxy penetration, reduces the exothermic heat from water/epoxy reaction, and preshrinks the fiber ends so as to prevent later shrinkage after potting.

The drying of the fibers can be conducted in a number of ways. For example, see U.S. Pat. Nos. 4,080,743 and 4,080,744 which teach the solution drying of fibers. Preferably the fibers are dried by contacting with a relatively dry gas. Commonly, such gas comprises air or other gas being less than about 50% saturated with water. The drying conditions such as temperature should be such that the membrane is not adversely affected. A suitable temperature is in the range from about 15° to about 60° C. While drying the fiber ends, it is generally necessary to maintain the remainder of the fiber bundle wet so that the permeability of the active portion of the fibers is substantially unaffected.

The substantially dried portion of the fibers are then contacted with the potting agent which will securely hold the fibers and form a relatively impermeable fluid barrier around the fibers. Most commonly, these potting agents are epoxies such as amine type epoxies. A means of fluid communication is then provided to the exterior of the active portion of the membranes. A means of fluid communication is also provided to the interior of the hollow fiber membranes so that fluid can be passed therethrough.

One method for formig the pot on the substantially dried fibers comprises brushing a suitable potting compound such as epoxy onto small bundles of fibers, clamping them into position and allowing the epoxy to cure. The entire bundle end can then be immersed into a container of potting compound to provide suitable diameter or shape of the potted end for the permeation unit. This technique is described in detail in reference to the drawings.

Another method for forming the pot on the substantially dried fibers comprises casting a suitable potting compound such as epoxy between and around the fiber ends. The fiber ends are placed in a mold and potting fluid injected into the mold.

DRAWINGS

Figure 3:
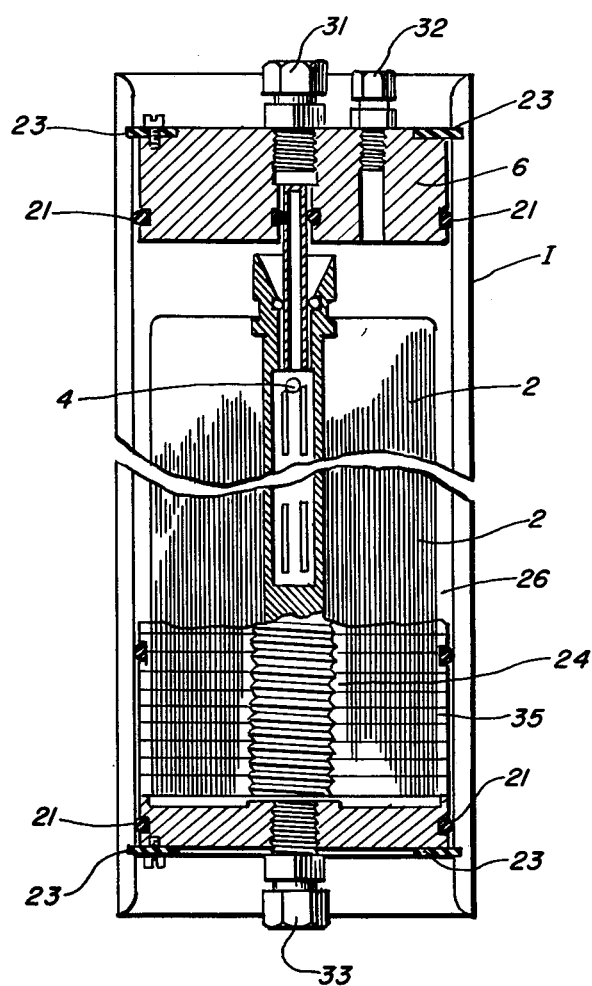
FIG. 3 is a schematic drawing of a commercially available reverse osmosis permeator.

FIG. 4, including FIGS. 4a, 4b, and 4c, and FIG. 5, including FIGS. 5a and 5b, show stepwise modifications of the reverse osmosis permeator from FIG. 3 to a suitable membrane separation device for the purposes of this disclosure.

Figure 6:
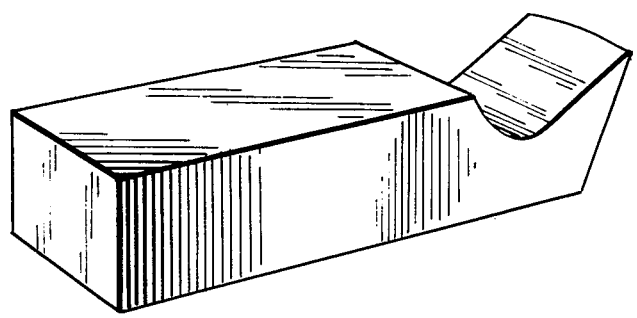

FIG. 6 is a drawing of a lathe tool which is especially useful in the manufacture of membrane permeation units.

Figure 1:
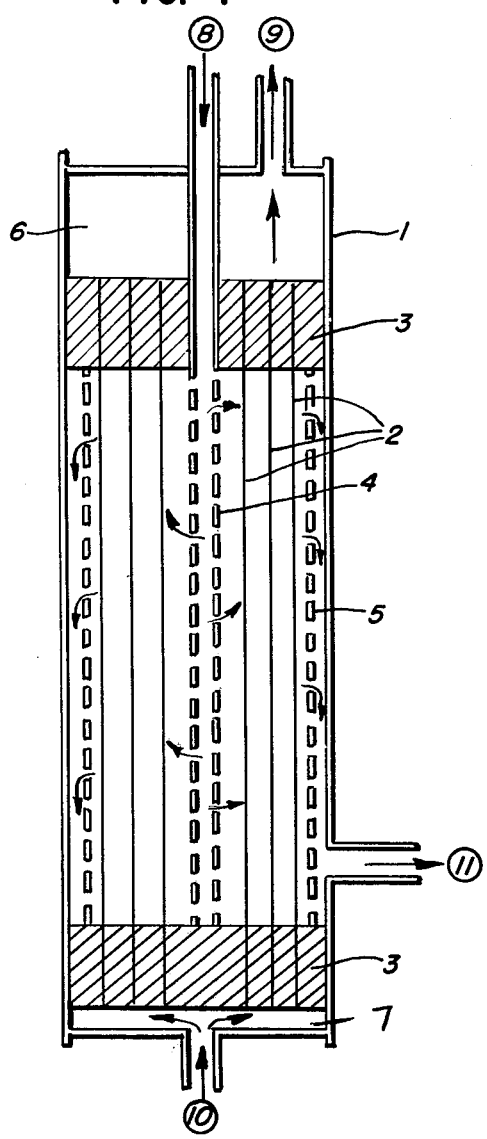
FIG. 1 is a schematic diagram of a membrane separation unit suitable for the separation of olefins from mixtures containing them.

Referring to FIG. 1, the membrane separation unit has an outer shell or casing 1 which contains within it tubular semipermeable membranes 2. These membranes are extremely small in diameter and are generally contained in bundles of about 10 to 200. Commonly, a total of several hundred thousand fibrous membranes will be contained within the outer shell 1. These tubular membranes are held or potted in a substance which is capable of securely holding the fibers and not deleteriously effected by the fluids which may contact it. Commonly this potting material 3 is an epoxy compound of the amine type. Amine type epoxies generally use amine curing agents or hardeners. For a more complete discussion of epoxy resins, see Kirk-Othmer Encyclopedia of Chemical Technology, second edition, volume 8 at pages 294-312, which is hereby incorporated by reference and made a part hereof. Generally, the fibers 2 are wrapped in a sheet of relatively permeable material in order to protect it from abrasion and to hold them together. Also commonly, a mechanical device 5 is contained within the membrane separation unit between the two potted areas 3 so as to give structural strength to the separation unit. This mechanical barrier 5 should prevent compression or forcing of the two potted areas together which might rupture or harm the membranes held therein. This mechanical means 5 should also enable fluid to pass to a point where it can be removed from the membrane separation unit. The sweep fluid, commonly a saturated hydrocarbon 8 is passed into the membrane separation unit through a slotted pipe distributor 4 which effectively disperses the sweep fluid within the bundle of fibers. The mixture of fluids to be separated 10 is passed into a manifold area 7 and then through the bores of the tubular membranes 2. The sweep fluid will remove olefinic materials which have permeated through the walls of the membranes to the exterior of the membranes and thereby removing unsaturates from the second side, in this case the exterior of the membranes. This removal of olefinic materials will reduce the partial pressure of olefin on the second side of the membranes thereby causing olefin to continually pass through the membranes from the inside to the outside. The mixture of sweep fluid and olefinic material which has permeated through the membranes is then passed between, around or through mechanical barrier 5 out of the membrane separation unit at position 11. The saturated components of the mixture to be separated do not significantly permeate the membranes. The saturated components of the mixture to be separated pass through the fibers 2 to manifold area 6 and out of the membrane separation unit at position 9.

Figure 2:
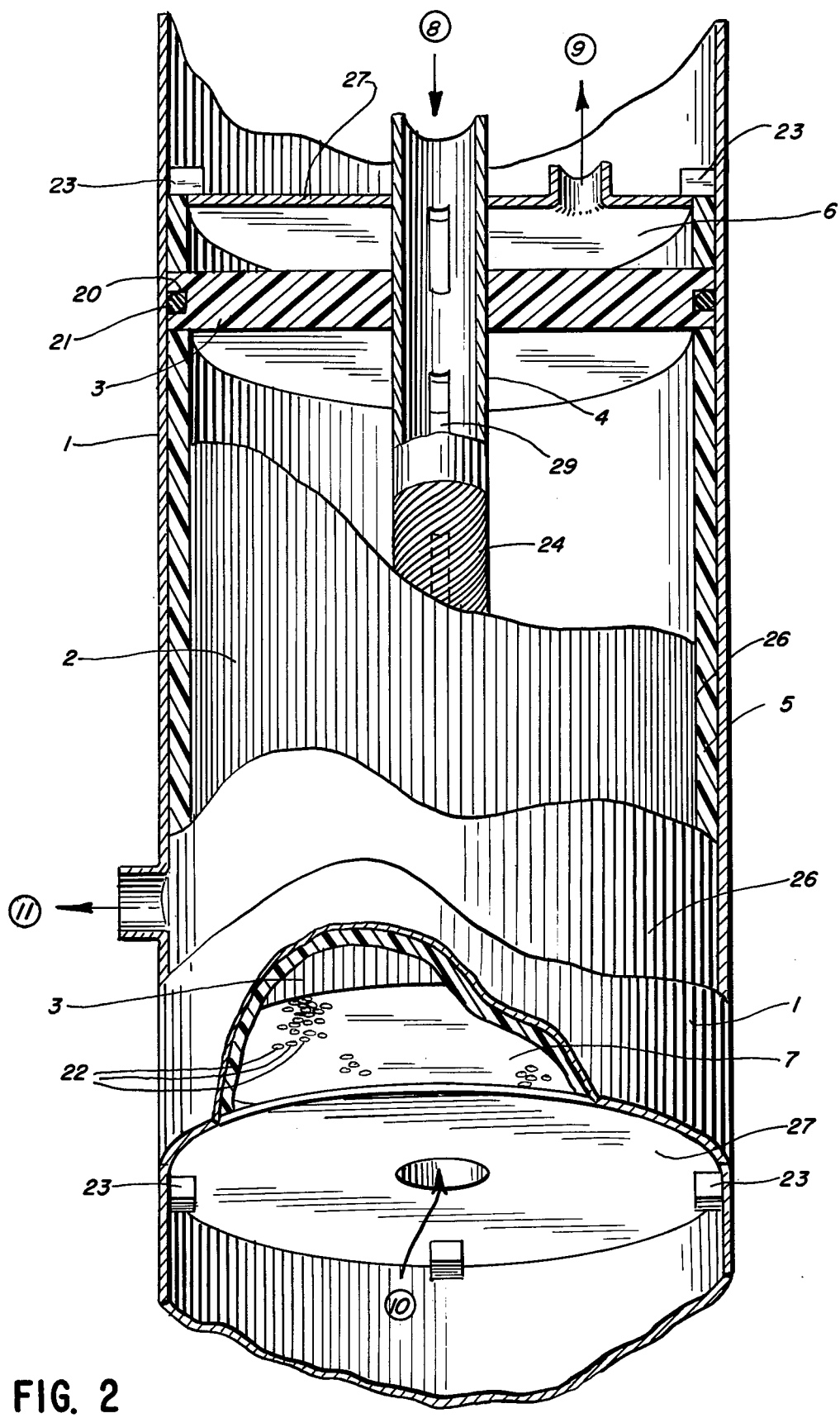
FIG. 2 is a more detailed multiple cutaway view of a membrane separation unit.

FIG. 2 is a somewhat more elaborate multiple cutaway view of a membrane separation unit. The unit has an exterior shell 1 and contains numerous fibers 2. The semipermeable membrane fibers 2 are potted at both ends in a potting compound 3 which also serves as a barrier to fluids held within the membrane separation unit. The drawing shows that the tubular membranes 2 extend through the potted area 3 and have opened ends 22. Starting at the interior of the membrane unit, there is the centrally located slotted distribution core having slots or openings so that fluids passing therethrough can be emitted outward in an effective distribution pattern. Naturally, the distributor can have numerous configurations and need not be centrally located. The distribution core 4 is commonly covered with a membranous or mechanical covering 24 to protect the fibers from irregularities in the distribution core or from high pressure fluids coming through the slots 29. The fibrous membranes 2 are enclosed within the membrane separation unit and potted at each end in an amine type epoxy resin. It is very desirable to substantially dry the ends of the fibers which are to be potted in the epoxy. The epoxy barrier, which not only holds the fibers in place but also acts as a barrier to fluids passing through the ends of the membrane unit, generally has a slotted annular ring groove 20 cut into the circumference of the epoxy so as to form a space for an O-ring seal 21. The tubular membranes are commonly wrapped with a polyester wrap or protective wrapping so as to hold the fibers or bundles of fibers in position and also protect them from abrasion. This wrap 26 is most commonly porous to gaseous or liquid flow. Because membrane separation units are commonly run under pressure, it is preferred to provide a mechanical device 5 which is capable of preventing compression of the potted areas 3. This can be a simple mechanical device such as a mechanically strong barrier of most any shape. Mechanical device 5 must provide for the passage of fluids from the interior of the membrane separation unit. This can readily be accomplished by holes, slots, or the like. Simple mechanical devices 23 are supplied on the ends of the case enclosing the membrane separation unit so as to prevent pressure from the inside of the unit from forcing the potted areas outward, thereby preventing destruction of the membranes.

Sweep fluid 8 is passed into the distribution core 4 and distributed outwardly through slots 29 into the cavity of the cylindrical separation unit. The mixture of fluids to be separated 10, is passed into the membrane separation unit in manifold 7 and passed through the interior bores 22 of the tubular membranes 2. The sweep fluid sweeps away olefinic materials which are present in the interior of the separator but on the exterior of the fibers, and thereby reduces their partial pressure therein. Materials which have not been transported across the membranes are collected in manifold area 6 for removal 9. This stream is somewhat deficient in olefinic material because of the olefins which have been selectively transported across the membrane. The mixture of sweep fluid and olefinic material is passed out of membrane separator at position 11.

FIG. 3 is a schematic diagram of a commercial reverse osmosis permeator. In this case, the reverse osmosis permeator is manufactured by Dow Chemicals and is the DOWEX (trademark) RO-4K permeator which is a water purification module generally used to remove dissolved solids from water by reverse osmosis. This reverse osmosis permeator contains an outer shell 1 and a large number of U-shaped fibrous membranes 2 which are secured at one end by a glue-type material. The fibers are actually bent in a U shape so that all fibers are attached on one end of the permeation unit (a single ended permeator). The reverse osmosis permeator has a slotted central distribution core 4 which is capable of distributing fluids into the interior space of the permeator. The permeator also contains simple mechanical connecting devices 31, 32, and 33 to provide connections for the communication of feed, brine, and product water respectively. A header 6 is securely held in place by simple mechanical devices 23, and a good fluid seal is provided around the header by an O-ring 21 which is located in a small annular groove around the periphery of the header. The outer case 1 of the permeator is made of a filament wound fiberglass with epoxy binder. Its main function is to enclose the fibers inside in a pressure compartment and enclose the pressurized fluids while protecting the fibers from the environment. The header 6 encloses the open end of the fiberglass case and is held in place by segmented rings. The proper fluid seals are provided by O-rings. The central distribution core 4 is a slotted hollow polyvinyl chloride tube which is covered with a screen outer wrap. While providing a means of distributing fluids within the interior of the membrane separation unit, the core also provides mechanical strength to the bundle of fibers running approximately parallel thereto. The tube sheet 35 is an epoxy compound which secures the open ends of the hollow fiber membranes. It also functions to separate the fluids on either side of it. The hollow fibers 2 which are contained within the membrane separation unit are preferably made of cellulose triacetate (generally described in U.S. Pat. No. 3,532,527). Cellulose acetate is produced with different degrees of acetylation. Preferably, the polymer is essentially completely acetylated. These membranes must be kept wet in order to prevent structural changes. Most of these membranes are anisotropic, and drying will change their structure and commonly change their permeability characteristics. The manufacturer of such membrane cautions that the total pressure differential across the membrane should not be more than about 75 psig and that temperatures of less than 0° C. or more than 30° C. can be harmful to these membranes. Also, total pressures of over 450 psig are considered detrimental.

The reverse osmosis separation unit from FIG. 3 can be modified so as to make a suitable membrane separation unit for the removal of olefins from mixtures containing them by removing the bundle of fibers from the outer case 1. After the bundle of fibers is removed from the outer case, a band saw is used to cut off the upper portion of the membrane unit (depicted in FIG. 3) leaving the fiber bundle as shown in FIG. 4a. This cutting will remove the U end of the fiber bundle. This is preferably done by using a band saw with the teeth running backwards from the normal direction, which tends to close the fiber ends at the cutting edge. It is also important not to pull the fibers, thereby breaking or deforming them. Reversing the saw teeth generally reduces pulling. The removed fiber bundle which has been sawed off at one end is shown in FIG. 4a. The fiber bundle 40 is covered with a polyester wrap 26. The central core distribution tube 4 is also shown. The top approximately 6 inches of the polyester wrap is removed and the fiber bundles are exposed and pulled apart from one another and from the distribution core 4 as shown in FIG. 4b.

The entire fiber bundle 40 is then inverted as is shown in FIG. 4c so that the exposed fibers 2 can be substantially dried. This can be done by blowing relatively dry air with fan 41 upwardly towards the downwardly positioned fibers. It is extremely important to dry the fiber ends which will be potted so as to provide stability in the operation of the membrane separation unit. The drying will cause the fibers to shrink prior to being bound in the epoxy, rather than in operation where it can cause ultimate failure of the device. Substantially drying the fibers will also cause better adhesion with the epoxy. The drying can be conducted by blowing with air for about 24 to 72 hours to substantially dry the fibers. This will make the outside of the fibers dry to the touch while the inside of the fibers may still be somewhat moist. Generally, the moisture content of the fibers is reduced by about 90 percent or more. The cut ends can be spread and held apart with a ¼ inch mesh scrim cloth which also reduces tangling. The fibers can be dried by other means, but the air drying is preferable and very convenient.

The active portion of the fibers between the potted ends, which will not be potted in the epoxy compound, should be kept moist so as to maintain performance standards. If these fibers are allowed to dry, their flux rate will generally decline.

A ten inch length of one inch O.D. Tygon tubing is inserted into the lower end of the slotted polyvinyl chloride distributor tube which forms the core of the permeator. A length of ¾" O.D. hardwood dowel is lubricated with stopcock grease and inserted into the Tygon tubing to prevent entry of epoxy in future steps. The dowel also is used as an axle for the permeator when it is mounted in a mechanical holding device in a future step. The lower five inches of the polyethylene mesh around the O.D. of the PVC tube is cut off since epoxy does not bond well to it.

Referring to FIG. 5, the bundle of fibers 40 is mounted in a device 50 which is capable of securely holding the entire membrane bundle. Preferably, the membrane holding device contains ratchet device 51 and bearing 52 so that the fiber bundle can be rotated in one direction or the other or held securely in place for ease of manipulation while modifying the bundle. Nylon lines 55 and 56 can be provided from adjustable tension reel devices 53 and 54 which in this case are mounted directly to the holding device 50. The next phase of the membrane modification will entail coating the dried fiber bundles with an epoxy so that a firm bond can be achieved.

The epoxy should cure in the presence of water and form a good strong bond. Commonly, water will accelerate the cross linking of certain types of epoxies and should therefore be controlled. Generally, it is desirable to select an epoxy which has a controlled reaction time so as to allow proper manipulation of the fiber bundles. If the epoxy cures too fast, excessive heat will be given off by the exothermal reaction and can adversely affect the membranes. The viscosity of the epoxy is relatively important also. It should not be so viscous so that it does not adequately wet the fibers; however, it should have suitable viscosity so that it is not substantially drawn up into the inside of the fibers by capillary action. Preferably, the epoxy should not have such a low viscosity as to excessively drip from the fibers, and the viscosity should be such that simple brush-on techniques can be used. The setting time of the epoxy should not be so short as not to allow suitable time for the manipulation of the fiber bundles but should not be so long as to prove economically unfeasible. Generally, a setting time of about one-half to about 5 hours is used, preferably about 1 to about 3 hours.

A suitable amine type epoxy formulation for the above step is 105 parts by weight of Celanese Epi Rez 510 and 35 parts by weight Celanese Epi Cure 872. This combination is strong, bonds well to damp fibers and cures rapidly. Being viscous it is difficult to vacuum degas. The epoxy starts to react before degassing can be completed. Therefore, it may be preferable to degas Epi Rez 510, which was found to contain most of the dissolved gasses, before stirring in the curing agent. Four 560 gram batches were prepared in this manner at 10–20 minute intervals during the brushing-on procedure.

As is shown in FIG. 5a, small bundles of fibers containing about 10 to about 200 fibers per bundle, preferably about 10 to 50 fibers per bundle, are bent and held upward. Nylon line 55 from adjustable tension reel 53 is provided while the entire fiber bundle 40 is rotated so that the line is wrapped around the fiber bundle securely holding the fiber bundles upwardly against the total fiber bundle. In some cases, it is preferable to use a level wind device so as to prevent the line 55 from building up at a given vertical level, thereby forming a hump and possibly damaging the fibers. The amount of tension from the adjustable reel 53 should not be so great as to substantially constrict or crimp the fibers. Commonly, about a tenth of about 2 pounds of tension is adequate, preferably about 1 pound. The O.D. of the PVC tube is cleaned with methyl ethyl ketone for better bonding of epoxy to the tubing. Fiber bundles are then unwrapped slowly from the outside diameter of the upwardly bent fiber bundles by rotating the fiber bundle 40 in the opposite direction as previously done so as to take up line on reel 53. While slowly rotating the total fiber bundle 40 to release the smaller bundles, each bundle is painted with epoxy using simple brush-on techniques and positioned downwardly, approximately parallel to the central distribution tube. As the fiber bundles are slowly let down, line 56 is taken off of spool 54 and used to wrap the downwardly positioned epoxied fiber bundles. Again, it is important not to have so much tension as to unduly crimp the fibers. The same tension used above will be suitable here. After essentially all of line 53 is recovered, substantially all of the exposed fiber bundles will be in the downward position and wrapped with line 56 from reel 54. As is shown in FIG. 5b, a cylindrical sleeve, commonly a slit cylindrical sleeve 57, is placed around the bundle of fibers so as to maintain them in the proper shape. A simple mechanical adjustable locking device 58 can be used to hold the sleeve in a proper position. The sleeve is commonly a polyethylene material so that the epoxy from the painted fiber bundles will not bond to the sleeve and the sleeve can be readily removed.

While the epoxy is curing and throughout the entire procedure, the active portion of the fiber bundle 40 should be kept moist and humidified so as not to harm the fibers. This can be done either by placing the entire unit in a controlled humidity room or by covering the active portions of the fibers with plastic.

After the epoxy used to coat the fiber bundles has set, the sleeve 57 is removed and the bottom 1½ inches of the epoxied fiber bundle cut off using a band saw run in the normal forward direction. The fiber ends which are now open and exposed are painted with 5 minute epoxy so as to close the fiber ends. Five minute epoxy is an extremely fast-setting epoxy. It is preferable that a viscous epoxy be used so as not to substantially penetrate the membrane bores. This epoxy is intended to close the end of the fiber bores while not substantially penetrating up the bore. The bundle of fibers is then wrapped with a fiberglass cloth. The fiberglass cloth is untreated so that it will bond to the epoxy which will be used. The fiber bundle 40 which is now wrapped in fiberglass cloth is immersed into a bucket of epoxy 59 so as to form a potted end of the fiber bundle. The epoxy is relatively low viscosity, adds extra width or diameter to the potted area, and may help complete the barrier between the fiber bundles. The low viscosity enhances penetration of the glass cloth. This epoxy preferably has a viscosity of less than about 5,000 centipoise at room temperature and will cure slowly, in greater than about 4 hours. Because the system which is being immersed into the epoxy bucket has very little moisture, the epoxy will be easier to select because water is no longer a significant consideration.

A suitable epoxy is 90 parts by weight Epi Rez 510, 10 parts by weight Epi Rez 5022, and 39 parts by weight Epi Cure 8799. Six batches of 139 grams each were mixed and degassed separately for this final potting procedure. Final potting is performed after the brushed on epoxy has cured to reduce exothermic temperature.

Because these membrane units commonly contain silver ion when used in the separation of olefins and because unreacted amine present in such fiber will be deleterious in that it will reduce silver ion to silver metal thereby plugging a membrane and reducing membrane selectivity, it is preferable to minimize the amount of unreacted amine. This can be done by using at least about 3 mole percent, preferably about 5 to about 10 mole percent, excess epoxy to amine in all epoxy formulations to secure the membranes.

After the epoxy has set, container 59 is removed and the excess diameter of the potted end of the fiber bundle is machined so as to reduce the diameter of the epoxy so as to fit the sleeve 1 of the outer container of the membrane unit. The outside diameter of the epoxy can also be machined so as to provide annular grooves for O-ring seals. Approximately one half of the end of the potted fiber bundle is cut off or removed by using a band saw in the normal forward position. This should remove the epoxy plugged fibers leaving the bores substantially open. However, the band saw will result in numerous plugged fibers through the cutting, crushing action of the saw. The number of open bores in the fiber bundle can be improved by mounting the fiber bundle on a lathe, warming the epoxy to greater than about 50° C. so as to soften the epxoy, and cutting the fiber ends with a very sharp tool. Preferably, moisture such as steam is applied to the fiber ends which will aid in opening the fiber bores and cutting them cleanly. A suitable lathe tool is shown in FIG. 6 and can be made from ⅜ by ⅜ inch tool steel. The tool has a relatively large nose radius and a sharp edge. Ideally, the tool will be passed by each fiber only once so that it will cleanly cut the fiber and not contact the fiber further.

The end of the central distribution tube 4 becomes plugged with epoxy during the bucket potting operation. The bore of the tube is drilled out for a one half inch stainless steel tube which is later epoxied in place and extends through potting area 3 and manifold area 6 as depicted in FIG. 1.

The potted end of the bundle of fibers can be formed not only by the brush-on technique but also by a casting technique. After the U-portion of the fibers is cut off and dried as previously described and depicted in FIG. 4, the small bundles of fibers are positioned downwardly, approximately parallel to the central distribution tube and squeezed together. Optionally potting compound distributors such as sticks can be placed in between the fiber bundles so as to help distribute the potting compound. The large bundle of fibers is then wrapped with fiberglass to aid in formation of a sealing surface for the O-rings. The fiber ends to be potted are then placed in a mold which is capable of holding potting compound. The potting compound such as epoxy is then injected into the mold and between and around the fibers to be potted. It is generally preferable to use a low viscosity epoxy for these purposes such as, for example, 95 parts by weight Epi Rez 510, 10 parts by weight Epi Rez 5022, and 35 parts by weight Epi Cure 872; or 85 parts by weight Epi Rez 510, 20 parts by weight Epi Rez 5022, and 35 parts by weight Epi Cure 872. Different curing agents may be substituted so as to minimize curing times, exotherm, and/or epoxy viscosity.

One possible method of casting such pots comprises forming the entire potted end in a single step so that the pot is readily adaptable to the membrane separation unit. In this case, the one-step casted pot is machined to the proper size and possibly annular grooves for O-rings provided. This one-step casting will minimize bonding problems between potting compounds cast at different times. However, because of the highly exothermic nature of potting compounds such as epoxies it may be desirable to first cast a pot so as to include all of the fibers but provide little additional diameter. A second step casting can be conducted to build up the diameter of the potted area so that it is suitable for machining and for use in semipermeable membrane permeators.

The fiber bundle 40 can now be reinserted within the case 1 from which it was removed and a hole cut in the side of the fiber case so as to provide an outlet for fluids exiting at position 11 from FIG. 2. Also, simple mechanical coupling devices are provided at the various positions 8, 9, 11, and 10 to provide coupling to tubing or pipes to provide for fluid communication with the membrane separation unit.

The techniques of this patent application may also be used when the starting fibers are substantially straight rather than U-shaped fibers.

The newly formed membrane separation unit is then tested for leaks prior to use for the separation of olefins. Gross leaks can be tested by inverting the partially completed membrane unit from the position that it was in FIG. 5. Water is placed in the manifold area 6, while gas such as air is provided at low pressures, about 1 psi, to the interior of the fiber bundle space. The water is observed for bubbles coming out of the fiber bores that are leaking. Somewhat smaller leaks can be detected by using aqueous salt solution such as sodium nitrate brine and measuring solution conductivity by well known techniques to locate leaks. Because these membranes have been used for water desalination by reverse osmosis, the fibers will exhibit salt rejection. If a salt or brine solution is provided to one side, for example the exterior, of the fibers by feeding such brine to the interior of the membrane separation unit, brine leaking to the second side, into the fibers, through damaged fibers will cause an increase in conductivity (and sometimes an increased flow rate) in the solutions emanating from the fibers that are leaking. If very few or no fibers are leaking, the conductivity of solutions passing out of the fiber bores will be relatively low. However, if a substantial number of fibers are leaking, the conductivity of such solutions will be greatly increased.

Suitable salts for leak detection are any ionic species capable of being rejected by the membrane being tested. The salts should not adversely affect the membrane as associated material such as potting compound or casings, or the aqueous barrier which will later be placed into or onto the membrane. For example, traces of the salt should not cause the precipitation of silver ion if such ion is used in the aqueous barrier suitable. Some suitable salts are the alkali and alkaline nitrates, perchlorates, tetrafluoroborates and fluorides. Sodium nitrate has been found adequate.

If this conductivity test shows that there is significant leakage, the leaks can be located by providing a water soluble dye from the shell side of the membranes. A chromosome dye provided to the shell side of the membranes will pass into those membranes which are damaged and leaking. By using a microscope and looking at the ends of the fibers which are positioned in the epoxy potting compound, one can actually see those fibers which are leaking. The leaking fibers are most easily dealt with by using a small drill to drill out the portion of the leaking fiber end in the epoxy and then adding fresh epoxy in that small drill hole so as to effectively seal that fiber and fluid passageway. Generally, it is difficult if not impossible to drill out a single fiber and several other fibers will be plugged by using this technique. However, because of the large number of fibers present, the loss of a few additional fibers is generally considered insignificant.

Generally leaks occur either in or near one of the epoxy pots. In such cases the conductivity of water flowing from that end will be substantially greater than that flowing from the other end. Repairs to the epoxy pots are made until the conductivity of water flowing out of both ends is essentially the same and is also considerably less than the conductivity on the shell side.

I claim:

1. A method for the detection of leaking hollow fibers, said fibers exhibiting salt rejection, said method comprising:

contacting one side of one or more fibers with an aqueous salt solution so that purified water will pass across non-leaking fibers to the second side of such fibers and a salt enriched aqueous solution will pass to the second side of leaking fibers; and measuring the salt content of the aqueous solution on the second side of the fiber or fibers so that leaking fibers can be detected.

2. The method of claim 1 wherein the salt content of the aqueous solution is determined by conductivity measurements.

3. A method for the detection of leaking semipermeable membranes, said membranes exhibiting salt rejection, said method comprising:

contacting one side of one or more semipermeable membranes with an aqueous salt solution so that purified water will pass across non-leaking membranes to the second side of such membranes and a salt enriched aqueous solution will pass to the second side of leaking membranes; and measuring the salt content of the aqueous solution on the second side of the membrane or membranes so that leaking membranes can be detected.

4. The method of claim 3 wherein the salt content of the aqueous solution is determined by conductivity measurements.

* * * * *